(12) United States Patent
Sakhare et al.

(10) Patent No.: US 12,215,749 B2
(45) Date of Patent: Feb. 4, 2025

(54) BRAKE ASSEMBLY HAVING A SENSOR UNIT

(71) Applicant: ArvinMeritor Technology, LLC, Troy, MI (US)

(72) Inventors: Sukrut Sakhare, Troy, MI (US); Daniel Philpott, Troy, MI (US); Alex Adkins, Troy, MI (US); Phillip Leicht, Troy, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 342 days.

(21) Appl. No.: 17/676,530

(22) Filed: Feb. 21, 2022

(65) Prior Publication Data

US 2023/0265902 A1 Aug. 24, 2023

(51) Int. Cl.

| F16D 66/02 | (2006.01) |
|---|---|
| F16D 65/097 | (2006.01) |
| F16D 66/00 | (2006.01) |
| F16D 127/02 | (2012.01) |
| G01B 7/06 | (2006.01) |
| G01K 1/14 | (2021.01) |

(52) U.S. Cl.
CPC ....... F16D 66/027 (2013.01); F16D 65/0976 (2013.01); G01B 7/06 (2013.01); G01K 1/14 (2013.01); *F16D 2066/001* (2013.01); *F16D 2127/02* (2013.01)

(58) Field of Classification Search
CPC ............ F16D 65/0973; F16D 65/0976; F16D 65/0978; F16D 66/024; F16D 66/027; F16D 2055/0029; F16D 2066/001; F16D 2127/02; G01B 7/06; G01K 1/14

USPC ........................................................ 188/1.11 L
See application file for complete search history.

(56) References Cited

U.S. PATENT DOCUMENTS

| 3,976,167 | A | * | 8/1976 | Hirai ................... F16D 65/0975 188/1.11 R |
|---|---|---|---|---|
| 4,491,204 | A | | 1/1985 | Dirauf et al. |
| 4,742,326 | A | | 5/1988 | Gregoire et al. |
| 7,011,185 | B2 | * | 3/2006 | Kramer ................. F16D 66/024 188/1.11 E |
| 8,857,575 | B2 | | 10/2014 | Philpott |
| 10,309,470 | B1 | | 6/2019 | Philpott |
| 10,955,018 | B2 | | 3/2021 | Isshiki |

(Continued)

FOREIGN PATENT DOCUMENTS

| DE | 10023767 A1 | 11/2001 | |
|---|---|---|---|
| DE | 102019103827 A1 * | 8/2020 | ........... F16D 55/226 |

(Continued)

OTHER PUBLICATIONS

Extended European Search Report dated Jul. 18, 2023 for related European Appln. No. 23156947.6; 8 Pages.

(Continued)

*Primary Examiner* — Robert A. Siconolfi
*Assistant Examiner* — San M Aung
(74) *Attorney, Agent, or Firm* — Brooks Kushman PC (57) ABSTRACT

A brake assembly that includes a brake pad assembly, a pad spring, and a sensor unit. The brake pad assembly includes friction material disposed on a backplate. The pad spring is mounted to the backplate. The sensor unit straddles the backplate and extends from the backplate to the pad spring.

20 Claims, 9 Drawing Sheets

(56) References Cited

U.S. PATENT DOCUMENTS

| | | |
|---|---|---|
| 2018/0106313 A1 | 4/2018 | Fricke et al. |
| 2018/0283482 A1* | 10/2018 | Pahle .................... F16D 66/021 |
| 2019/0309813 A1* | 10/2019 | Isshiki ................. F16D 65/183 |
| 2020/0355232 A1 | 11/2020 | Adkins et al. |
| 2021/0246952 A1 | 8/2021 | Adkins et al. |

FOREIGN PATENT DOCUMENTS

| | | |
|---|---|---|
| EP | 1 241 369 A2 | 9/2002 |
| EP | 1474619 A2 | 11/2004 |
| EP | 2175158 A1 | 4/2010 |
| EP | 2 557 330 A1 | 2/2013 |
| EP | 2631505 A1 | 8/2013 |
| JP | 2003148525 A | 5/2003 |
| JP | 2009127715 A | 6/2009 |
| WO | 2014097098 A1 | 6/2014 |
| WO | 2017060515 A1 | 4/2017 |
| WO | 2018234665 A1 | 12/2018 |

OTHER PUBLICATIONS

U.S. Appl. No. 17/345,179 filed Jun. 11, 2021; 39 Pages.
Extended European Search Report dated Jun. 13, 2024 for related European Appln. No. 24158389.7; 7 Pages.

* cited by examiner

BRAKE ASSEMBLY HAVING A SENSOR UNIT

TECHNICAL FIELD

This relates to a brake assembly that has at least one sensor unit that is mounted to a backplate of a brake pad assembly.

BACKGROUND

A disc brake assembly having a sensor assembly is disclosed in U.S. patent application Ser. No. 17/345,179.

SUMMARY

In at least one embodiment, a brake assembly is provided. The brake assembly includes a brake pad assembly, a pad spring, and a sensor unit. The brake pad assembly includes friction material disposed on a front side of a backplate. The pad spring is mounted to the backplate. The sensor unit straddles the backplate and extends from the backplate to the pad spring.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
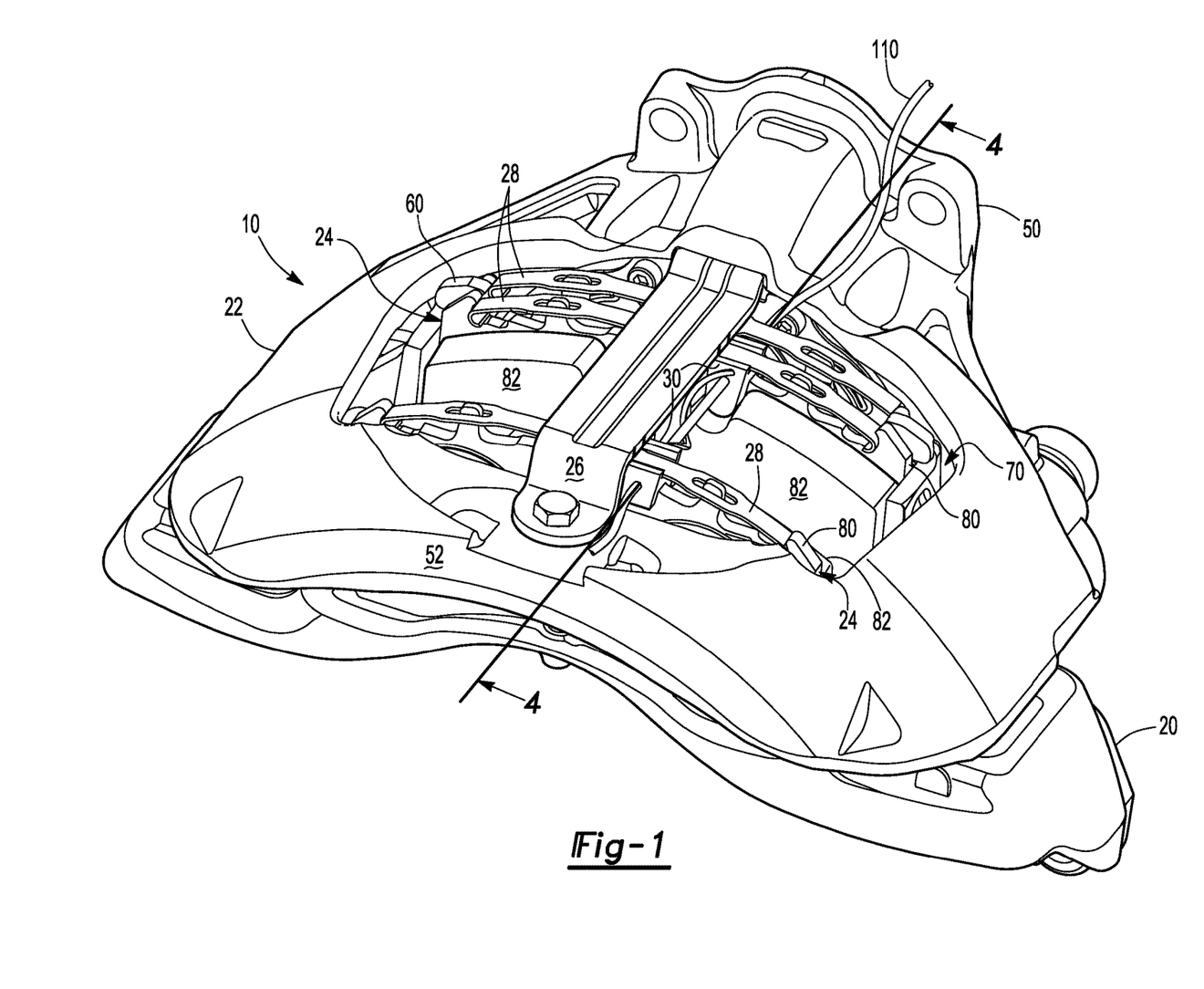
FIG. 1 is a perspective view of an example of a brake assembly.
Figure 9:
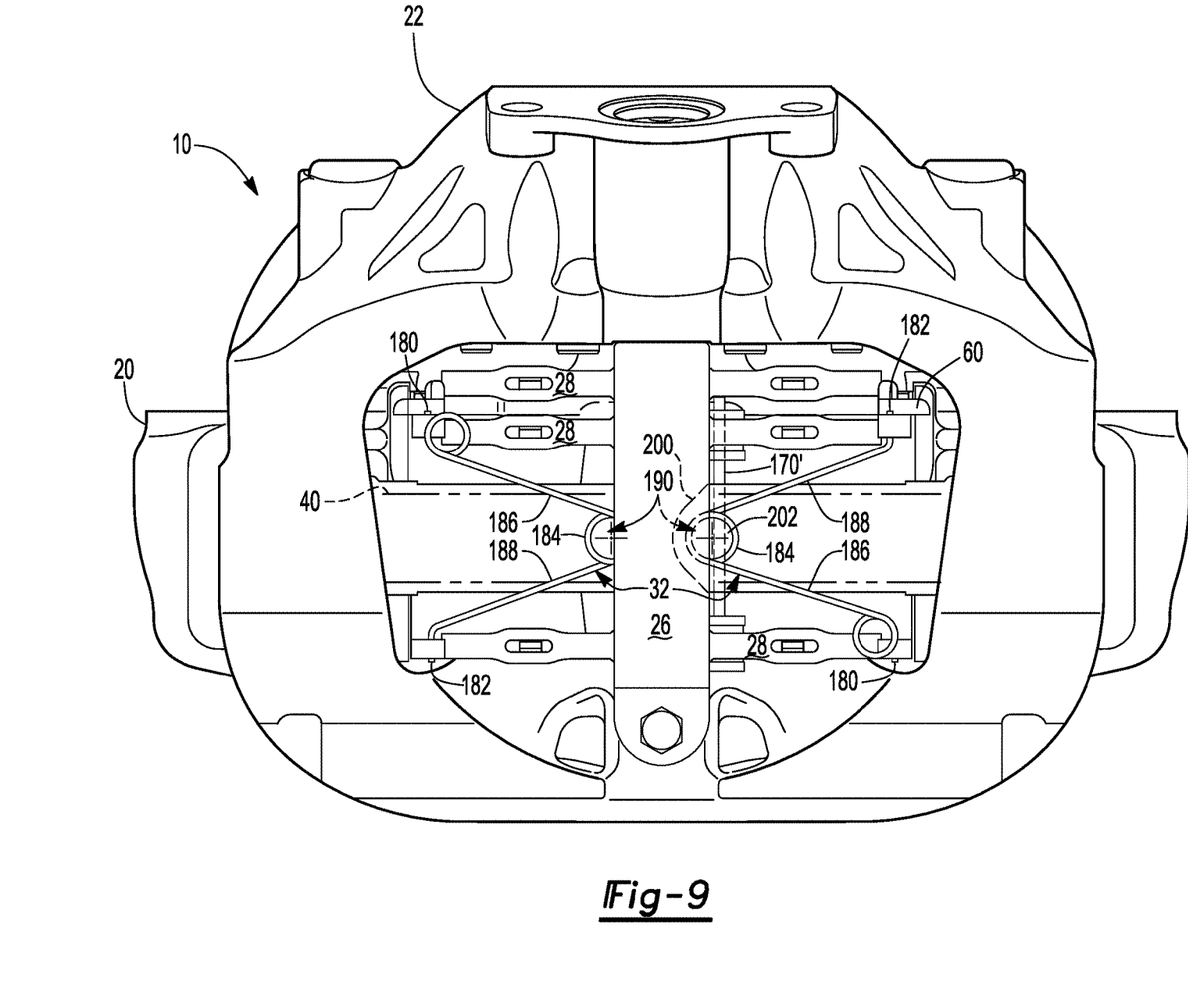
FIG. 9 is a top view of the brake assembly of FIG. 1 including examples of pad retraction springs and a sensor units that are attachable to a pad retraction spring.

Referring to FIG. 1, an example of a brake assembly 10 is shown. The brake assembly 10 may be provided as part of a vehicle, such as a truck, bus, farm equipment, military transport or weaponry vehicle, or cargo loading equipment for land, air, or marine vessels. In at least one configuration, the brake assembly 10 may be configured as a disc brake assembly and may include a brake carrier 20, a brake caliper 22, at least one brake pad assembly 24, a retainer strap 26, one or more pad springs 28, and one or more sensor units 30. Optionally, one or more brake pad retraction springs 32 may also be provided with the brake assembly 10, examples of which are best shown in FIG. 9.

Referring to FIG. 1, the brake carrier 20 may facilitate mounting of the brake assembly 10. For instance, the brake carrier 20 may be fixedly mounted to a component of the vehicle, such as an axle assembly or a knuckle. The brake carrier 20 may receive and support the brake pad assemblies 24 and may include an opening through which a brake rotor 40 (shown in phantom in FIGS. 4 and 9) may extend. For instance, the brake carrier 20 may cradle or support the bottom and lateral sides of a brake pad assembly 24. In at least one configuration, the brake carrier 20 may straddle the brake rotor 40 and may help position brake pad assemblies 24 on opposite sides of the brake rotor 40.

The brake caliper 22 may be mounted to the brake carrier 20 and may support various components of the brake assembly 10. In addition, the brake caliper 22 may help position the brake pad assemblies 24 with respect to the brake rotor 40 to facilitate braking of the vehicle as will be discussed in more detail below. In at least one configuration, the brake caliper 22 may include a caliper housing 50 and a caliper bridge 52.

The caliper housing 50 may be moveably disposed on the brake carrier 20. For example, the caliper housing 50 may be slidable along a pair of guide pins that may be fixedly disposed on the brake carrier 20. The caliper housing 50 may receive or support various components that may facilitate actuation of a brake pad assembly 24. For instance, the caliper housing 50 may support a tappet 60 that may protrude from an internal chamber of the caliper housing 50.

The tappet 60 may extend from the caliper housing 50 toward the brake rotor 40 to engage a brake pad assembly 24. The tappet 60 may be moveable along an axis with respect to the caliper housing 50 such that the tappet 60 may move toward and away from the brake rotor 40. For instance, an actuator may extend the tappet 60 to actuate a brake pad assembly 24 that is disposed between the caliper housing 50 and the brake rotor 40 into engagement with the brake rotor 40. A reaction force may then move the caliper housing 50 and caliper bridge 52 with respect to the brake carrier 20 to actuate a brake pad assembly 24 that is disposed between the caliper bridge 52 and the brake rotor 40 into engagement with an opposite side of the brake rotor 40 to help slow rotation of the brake rotor 40 and an associated vehicle wheel.

The caliper bridge 52 may be fixedly positioned with respect to the caliper housing 50. The caliper bridge 52 may be integrally formed with the caliper housing 50 or may be a separate component that is mounted to the caliper housing 50. For example, the caliper bridge 52 may be coupled or secured to the caliper housing 50 with one or more fasteners, such as bolts. In at least one configuration, the caliper bridge 52 may cooperate with the caliper housing 50 to define a cavity 70.

The cavity 70 may at least partially receive the brake pad assemblies 24 and the brake rotor 40. The cavity 70 may be configured as a large through hole that may be encircled by the brake caliper 22. A portion of the brake carrier 20 may extend into the cavity 70 and may help position the brake pad assemblies 24. A brake pad assembly 24 may be inserted into the cavity 70 and installed on the brake carrier 20 or removed from the cavity 70 and the brake carrier 20 when the retainer strap 26 is removed.

Figure 2:
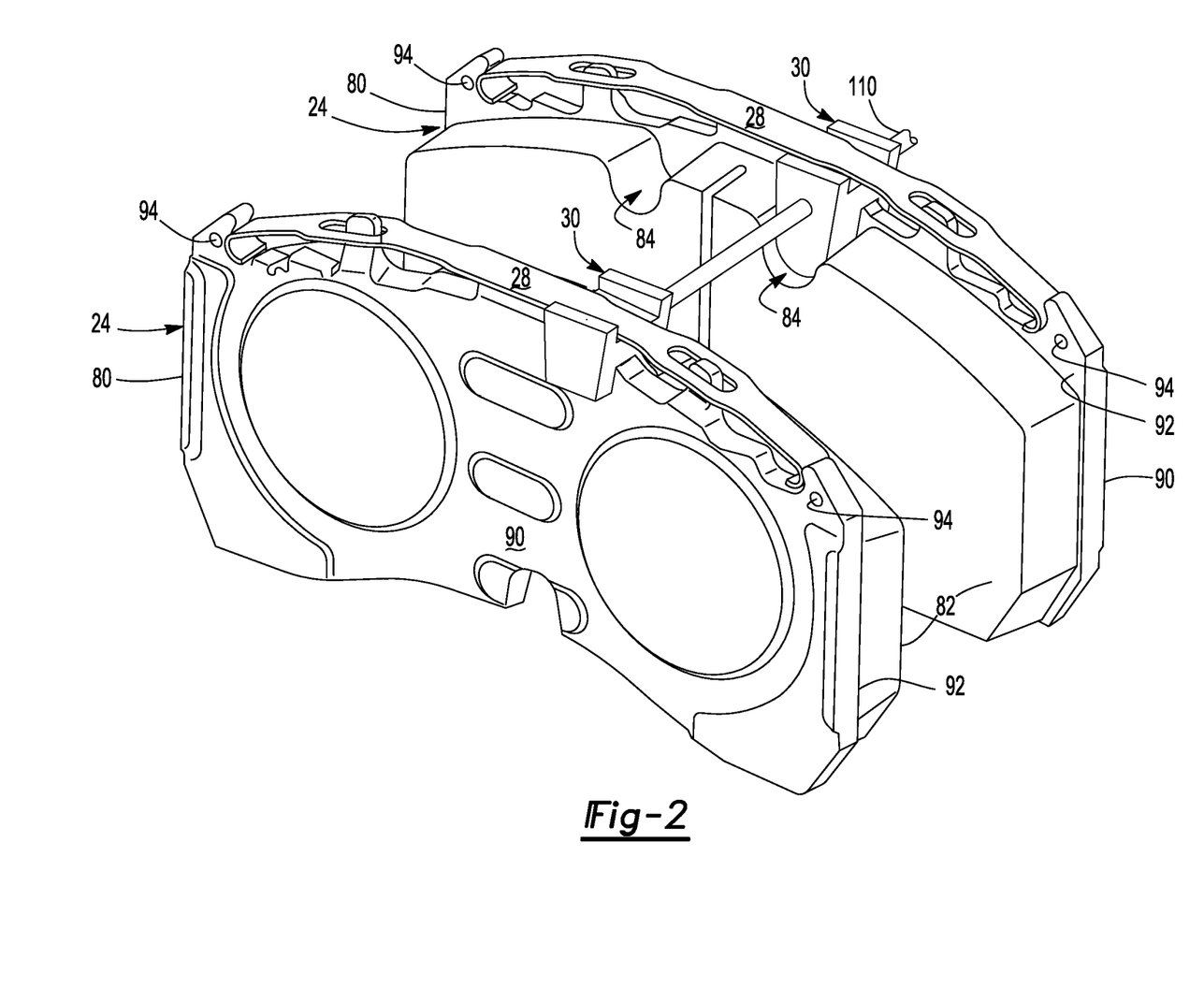
FIG. 2 is a magnified perspective view of some components of the brake assembly shown in FIG. 1, including brake pad assemblies, pad springs, and sensor units.
Figure 3:
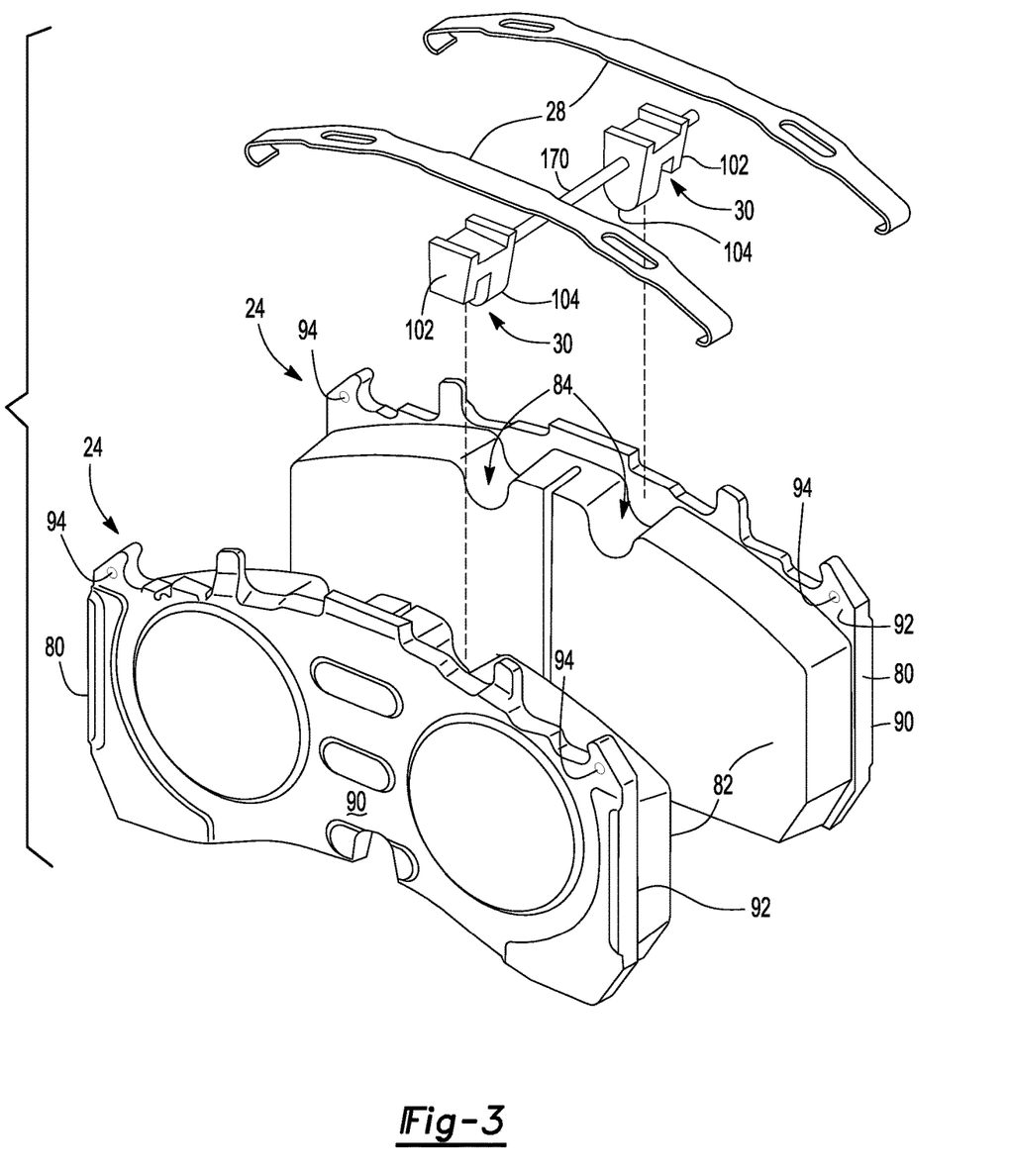
FIG. 3 is an exploded view of FIG. 2.
Figure 4:
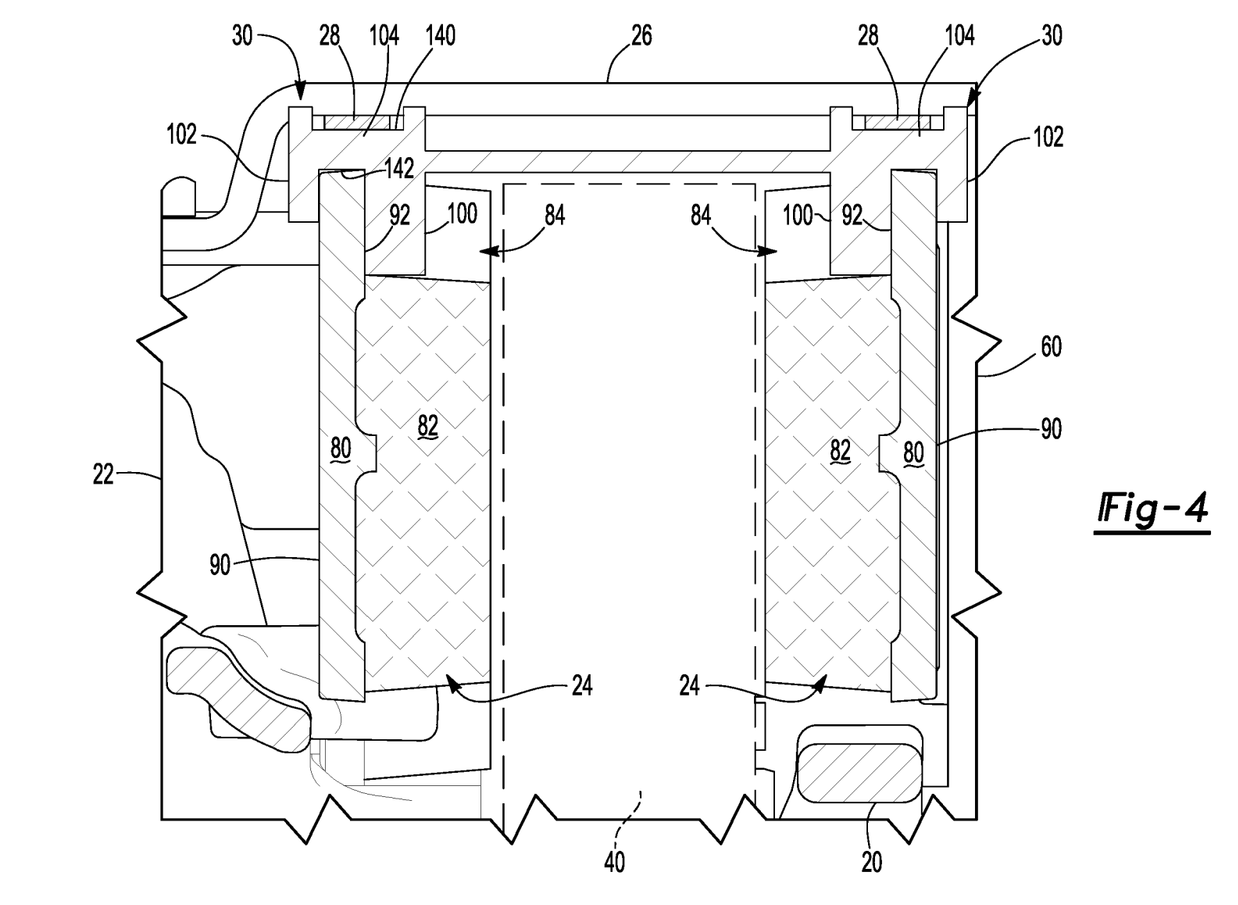
FIG. 4 is a section view along section line 4-4 with internal features of the sensor unit omitted for clarity.

Referring primarily to FIGS. 2-4, a pair of brake pad assemblies 24 may be received in the brake carrier 20. The brake pad assemblies 24 may be disposed on opposite sides of the brake rotor 40 and may have similar or identical configurations. For convenience in reference, the brake pad assembly 24 that is disposed between the brake rotor 40 and the tappet 60 may be referred to as an inboard brake pad assembly while the brake pad assembly 24 that is disposed between the brake rotor 40 and the caliper bridge 52 may be referred to as an outboard brake pad assembly. Also for convenience in reference, the brake pad assemblies 24 may be referred to as a "first brake pad assembly" and a "second brake pad assembly" below. The first and second brake pad assemblies may be the inboard and outboard brake pad assemblies, respectively, or vice versa. In at least one configuration, a brake pad assembly 24 may include a backplate 80 and friction material 82.

The backplate 80 may be a structural member of the brake pad assembly 24. The backplate 80 may be configured as a generally flat plate and may be made of any suitable material, such as a metal alloy. The tappet 60 may engage the backplate 80 of the inboard brake pad assembly 24. For instance, the tappet 60 may engage a rear side 90 of the backplate 80 of the inboard brake pad assembly 24 that faces away from the brake rotor 40 and that may be disposed opposite a front side 92 of the backplate 80 and the friction material 82. The rear side 90 of the backplate 80 of the outboard brake pad assembly 24 may engage the caliper bridge 52. The backplate 80 may include a plurality of tabs or hooks that may facilitate mounting of a pad spring 28. The tabs or hooks may protrude or extend from a top side of the backplate 80 and may extend away from an opposing bottom side of the backplate 80 that may engage the brake carrier 20.

Referring to FIGS. 2 and 3, the backplate 80 may optionally have one or more holes 94 that may facilitate mounting of a brake pad retraction spring 32. In at least one configuration, a hole 94 may be disposed above the friction material 82.

The friction material 82 may be disposed on the front side 92 of the backplate 80 and may face toward the brake rotor 40. The friction material 82 may contact the brake rotor 40 during vehicle braking. The friction material 82 may define at least one recess 84. The recess 84 may extend from a top side of the friction material 82 away from the pad spring 28. The recess 84 may extend through the thickness of the friction material 82. In at least one configuration, the recess 84 may be tapered along the thickness of the friction material 82 (e.g., the recess 84 may be tapered to become narrower as the recess 84 extends toward the backplate 80), tapered vertically or radially (e.g., the recess 84 may be tapered to become narrower as the recess 84 extends downward or away from the pad spring 28), or combinations thereof.

Referring to FIG. 1, the retainer strap 26 may be removably mountable to the brake caliper 22. For instance, the retainer strap 26 may be removed from the brake caliper 22 to facilitate removal or replacement of a brake pad assembly 24 and may be installed on the brake caliper 22 to inhibit removal of a brake pad assembly 24. The retainer strap 26 may extend across the brake pad assemblies 24 and the cavity 70 of the brake caliper 22 to help retain the brake pad assemblies 24 in the brake carrier 20 when the retainer strap 26 is secured to the brake caliper 22. The retainer strap 26 may engage or contact a pad spring 28 when the retainer strap 26 is installed and secured to the brake caliper 22. A first end of the retainer strap 26 may be mounted to the caliper housing 50. A second end of the retainer strap 26 that is disposed opposite the first end may be disposed on the caliper bridge 52 and may be secured to the caliper bridge 52, such as with a fastener like a bolt.

A pad spring 28 may exert a biasing force against a component that is received in the cavity 70, such as a brake pad assembly 24 or the tappet 60. For instance, a pad spring 28 may be mounted to a backplate 80 of a brake pad assembly 24, the tappet 60, or combinations thereof. In the configuration shown, three pad springs 28 are illustrated; however, it is contemplated that a lesser number of pad springs 28 may be provided. The pad springs 28 may be spaced apart from each other and may extend from the retainer strap 26 toward or into the cavity 70. For instance, from the perspective shown in FIG. 1 the uppermost pad spring 28 may extend from the retainer strap 26 to the tappet 60, the middle pad spring 28 may extend from the retainer strap 26 to the first brake pad assembly 24, and the remaining pad spring 28 may extend from the retainer strap 26 to the second brake pad assembly 24. A pad spring 28 may be secured to the tappet 60 or a backplate 80 in any suitable manner. For instance, as is best shown in FIG. 2, a pad spring 28 may have opposing ends that engage the backplate 80 and that may be received in a notch that is formed in a tab, hook, or other protrusion that protrudes from a top side of the backplate 80. As such, a pad spring 28 may generally extend the majority of the top side of the backplate 80.

Referring to FIGS. 1 and 2, one or more sensor units 30 may be provided with the brake assembly 10. A sensor unit 30 may be mounted to a brake pad assembly 24. For instance, a sensor unit 30 may straddle the backplate 80, which may help retain the sensor unit 30 on the backplate 80 when the brake pad assembly 24 is actuated. A sensor unit that straddles the backplate 80 may not extend through an opening or open-ended slot that is provided in the backplate 80. The sensor unit 30 may extend from the backplate 80 to the pad spring 28, which may help retain the sensor unit 30 on the backplate 80 and inhibit movement of the sensor unit 30 away from the brake carrier 20 and the bottom side of the backplate 80. The sensor unit 30 may be partially received in the recess 84 of the friction material 82 which may allow the sensor unit 30 to engage the friction material 82 to limit circumferential movement of the sensor unit 30 with respect to the friction material 82. In at least one configuration and as is best shown with reference to FIGS. 5 and 6, the sensor unit 30 may include a front body 100, a rear body 102, a bridge 104, and one or more sensors, such as a first sensor 106 and a second sensor 108. The sensor unit 30 may also include or be associated with one or more electrical conductors 110, a sleeve 112, and a coil member 114.

Figure 5:
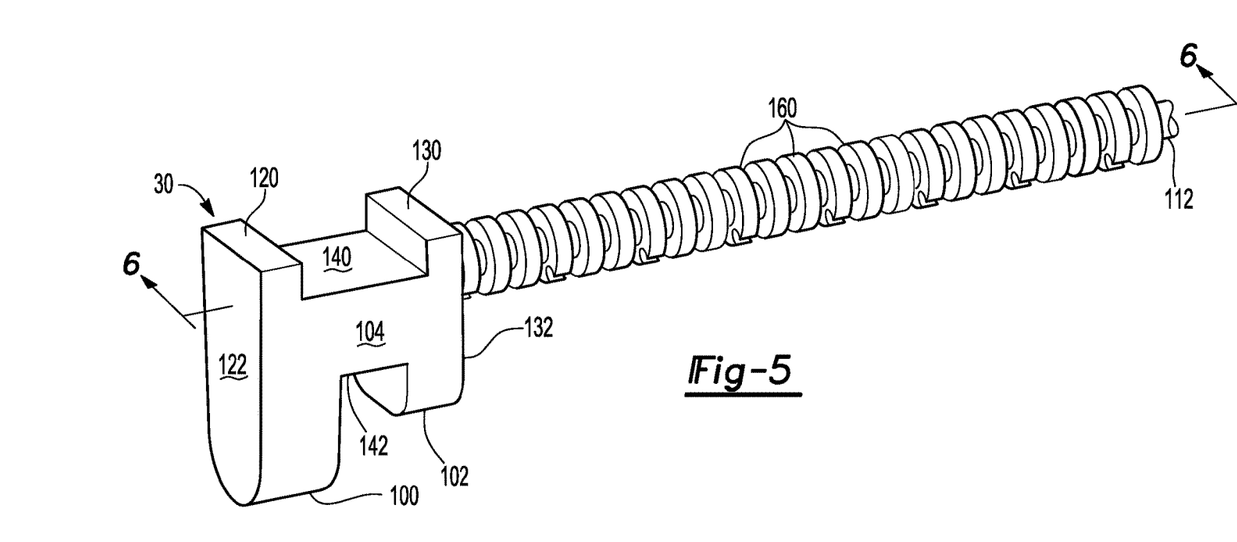
FIG. 5 is a perspective view of an example of a sensor unit and a sleeve.

Referring to FIGS. 4 and 5, the front body 100 may engage the front side 92 of the backplate 80. For instance, the front body 100 may contact and extend along a portion of the front side 92 of the backplate 80 where the friction material 82 is not present and into the recess 84 of the friction material 82. At least a portion of the front body 100 may have a width that is smaller than the width of the recess 84 to facilitate insertion of the front body 100 into the recess 84. Alternatively the front body 100 may contact and conform to the shape of the recess 84. Moreover, tapering of the recess 84 may facilitate installation of the front body 100 while permitting the front body 100 to contact multiple sides or surfaces of the friction material 82 that define the recess 84 to help secure the front body 100. The front body 100 may protrude from the front side 92 toward the brake rotor 40 and the friction material 82. In at least one configuration, the front body 100 may have a thickness in a direction that extends away from the rear body 102 that may be less than or equal to the thickness of the friction material 82 when the friction material 82 is unworn. Optionally, the front body 100 may have a greater thickness than the rear body 102. As is best shown in FIG. 4, the front body 100 may extend farther downward or further away from the pad spring than the rear body 102. In at least one configuration, the front body 100 may include a front body protrusion 120.

The front body protrusion 120 may be disposed proximate the pad spring 28. The front body protrusion 120 may extend away from the friction material 82 or extend in an upward direction from the perspective shown. In at least one configuration, the front body protrusion 120 may be aligned with and may extend from a frontal side 122 of the front body 100 that faces away from the rear body 102. The front body protrusion 120 may be disposed adjacent to a side of the pad spring 28 that faces toward the brake rotor 40 and may help locate the sensor unit 30 with respect to the pad spring 28. Optionally, a side of the front body protrusion 120 that faces toward the pad spring 28 may engage the pad spring 28.

The rear body 102 may be spaced apart from the front body 100. The rear body 102 may engage the rear side 90 of the backplate 80. For instance, the rear body 102 may contact and extend along a portion of the rear side 90 of the backplate 80. The rear body 102 may protrude from the rear side 90 of the backplate 80 away from the brake rotor 40 and the friction material 82. The rear body 102 may have the same width or a different width than the front body 100. In addition, the rear body 102 may be thicker than shown, which may provide a larger volume for receiving circuitry or other components. In at least one configuration, the rear body 102 may have a rear body protrusion 130.

The rear body protrusion 130 may be spaced apart from the front body protrusion 120. The rear body protrusion 130 may be disposed proximate the pad spring 28. The rear body protrusion 130 may extend in an upward direction from the perspective shown. In at least one configuration, the rear body protrusion 130 may be aligned with and may extend from a rearward facing side 132 of the rear body 102 that faces away from the front body 100. The rear body protrusion 130 may be disposed adjacent to a side of the pad spring 28 that faces away from the brake rotor 40 and may help locate the sensor unit 30 with respect to the pad spring 28. Such, the pad spring 28 may be received between the front body protrusion 120 and the rear body protrusion 130. Optionally, a side of the rear body protrusion 130 that faces toward the pad spring 28 may engage the pad spring 28.

Figure 6:
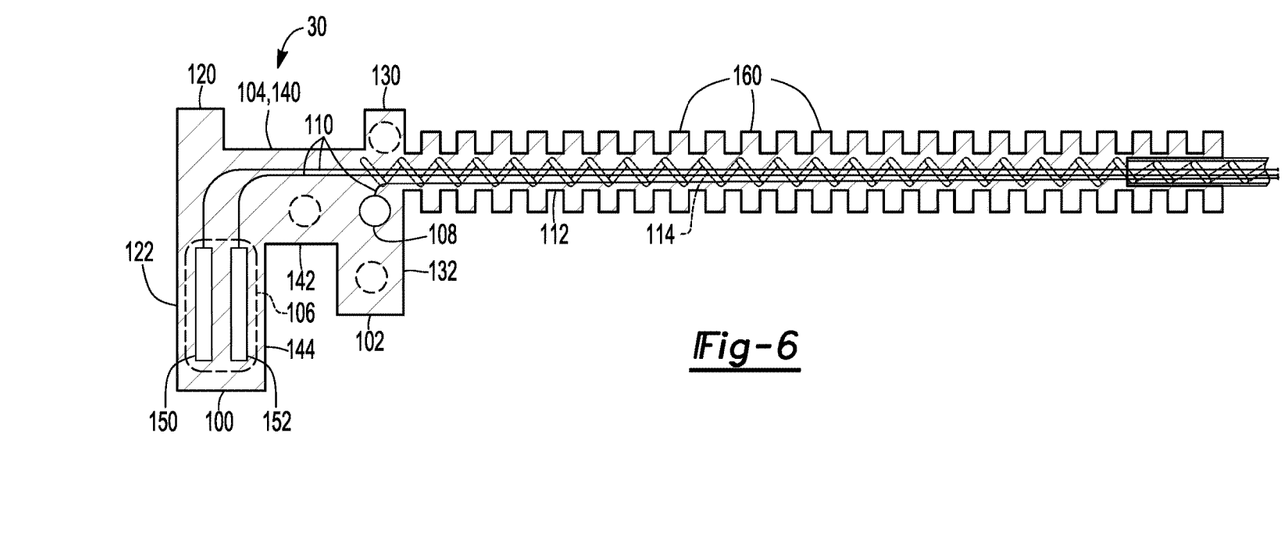
FIG. 6 is a section view along section line 6-6

The bridge 104 may interconnect the front body 100 and the rear body 102. For instance, the bridge 104 may extend from the front body 100 to the rear body 102 and may extend across the backplate 80. The bridge 104 may engage the pad spring 28 and the backplate 80. For instance, a top side 140 of the bridge 104 may face toward and may engage the pad spring 28 while a bottom side 142 of the bridge 104 may face toward and may engage a side of the backplate 80, such as a top side of the backplate 80 that may face toward the retainer strap 26. The top side 140 may be longer than the bottom side 142. For instance, the top side 140 may have a length from the front body protrusion 120 to the rear body protrusion 130 that is greater than a length of the bottom side 142 from the front body 100 to the rear body 102. The height of the bridge 104 from the top side 140 to the bottom side 142 may be less than the height of the front body 100 and the rear body 102.

The bridge 104 may be integrally formed with the front body 100 and the rear body 102. For instance, the front body 100, rear body 102, and the bridge 104 may be integrally formed of a polymeric material, such as silicone that can withstand the temperatures associated with braking while maintaining sufficient structural integrity (e.g., without melting). Moreover, such a material may limit heat absorption and help provide a degree of thermal insulation that may help protects sensors inside the sensor unit 30.

Referring to FIG. 6, sensors that may be provided with the sensor unit 30 will now be discussed. As an overview, one or more sensors may be encapsulated in the sensor unit 30. A sensor may be configured to provide a signal indicative of one or more attributes associated with the brake assembly 10. As examples, the sensor may detect or provide a signal indicative of wear of the friction material 82, temperature of the brake pad assembly 24, or the like. Sensors will be discussed below with reference to a first sensor 106 and a second sensor 108 that are of different types or that have different configurations; however, it is contemplated that a greater or lesser number of sensors may be provided.

The first sensor 106 may be encapsulated in the front body 100 of the sensor unit 30. For instance, the first sensor 106 may be positioned between the frontal side 122 and an opposing back side 144 that faces toward the front side 92 of the backplate 80 when the front body 100 is unworn. The first sensor 106 may provide a signal indicative of wear of the friction material 82. For example, the friction material 82 may contact the brake rotor 40 during braking, which may cause the friction material 82 to wear and decrease in thickness. After sufficient wear occurs, the side of the friction material 82 that faces toward the brake rotor 40 may be generally aligned with the frontal side 122 of the front body 100. As a result, additional brake applications may result in engagement of the friction material 82 and the front body 100 with the brake rotor 40 and wear of both the friction material 82 and the front body 100.

After sufficient wear occurs, the first sensor 106 or a portion thereof may be exposed and may contact the brake rotor 40 during braking and provide a signal that may be indicative of wear of the friction material 82 and that the brake pad assembly 24 should be replaced. For example, the signal may be generated by the first sensor 106 or may be associated with opening or closing an electrical circuit. For instance, the engagement of the brake rotor 40 with the first sensor 106 may sever or otherwise disconnect a normally continuous electrical circuit, resulting in a change to one or more electrical attributes, such as current or voltage, which may be detected or identified by an electronic controller that may receive the signal in a manner known by those skilled in the art. In FIG. 6, the first sensor 106 is shown with a first sensor portion 150 and a second sensor portion 152. The first sensor portion 150 is disposed closer to the frontal side 122 than the second sensor portion 152. Sufficient wear of the front body 100 may result in wear of the first sensor portion 150 and in an open circuit associated with the first sensor portion 150 while operation of the second sensor portion 152 may be unaffected. Accordingly, the signal may be indicative of friction material wear to at least the first sensor portion 150. Sufficient additional wear of the front body 100 may result in wear of the second sensor portion 152 and an open circuit associated with the second sensor portion 152. Accordingly, the signal may be indicative of fiction material wear to at least the second sensor portion 152. It is contemplated that a greater or lesser number of sensor portions may be provided. It is also contemplated that the first sensor portion 150 and second sensor portion 152 could represent different sensors rather than portions of the same sensor.

The second sensor 108 may also be encapsulated in the sensor unit 30. In at least one configuration, second sensor 108 or portion thereof may be positioned farther from the frontal side 122 than the first sensor 106. For instance, the second sensor 108 or a portion thereof may be positioned rearward of the first sensor 106, rearward of the front body 100, or both. For example, the second sensor 108 may be positioned in or encapsulated in the bridge 104, the rear body 102, the sleeve 112, or combinations thereof. Some examples of these locations are represented by circles shown in phantom in FIG. 6. In at least one configuration, the second sensor 108 may provide a signal indicative of temperature of the brake pad assembly 24. In such a configuration, the second sensor 108 may be of any suitable type, such as a thermocouple, thermistor, semiconductor temperature sensor, or the like. Positioning the second sensor 108 farther away from the friction material 82 may help limit the amount of heat that is conducted to the second sensor 108 and may allow a less expensive temperature sensor with a more limited operating range to be used.

One or more electrical conductors 110 may be electrically connected to the sensor or sensors provided with the sensor unit 30. An electrical conductor 110 may be of any suitable type, such as a wire, ribbon, or the like. An electrical conductor 110 may be provided with an insulator or coating that may help withstand operating temperatures. For instance, an electrical conductor 110 may be lacquer-coated, which may also help reduce the amount of sheathing or insulating material provided around an electrical conductor 110. One or more electrical conductors 110 may be associated with the first sensor 106 and the second sensor 108. In FIG. 6, electrical conductors 110 are represented by solid lines; however, it is to be understood that a solid line may represent more than one electrical conductor 110 so as to help form an electrical circuit.

The sleeve 112 may extend from the sensor unit 30. In addition, the sleeve 112 may encircle one or more electrical conductors 110 and may encapsulate a portion of an electrical conductor 110 that is disposed inside the sleeve 112 as well as an insulator or coating that is provided with the electrical conductor 110. The sleeve 112 may be integrally formed with the sensor unit 30. For instance, the sleeve 112 may be molded or formed of the same material as the front body 100, the rear body 102, the bridge 104, or combinations thereof. The sleeve 112 may extend from any suitable location on the sensor unit 30. In the configuration shown in FIGS. 5 and 6, the sleeve 112 extends from the rear body 102 in a direction that extends away from the front body 100 and the bridge 104; however, it is contemplated that the sleeve 112 may extend in a different direction or from a different side of the rear body 102, may extend from the front body 100, or may extend from the bridge 104.

The sleeve 112 may include a plurality of protrusions 160 that may extend away from the electrical conductor 110. The protrusions 160 may help limit or reduce the surface area of the sleeve 112 that may contact other components and thus help reduce the conduction of heat into the sleeve 112, may increase the surface area available for cooling, or combinations thereof. A protrusion 160 may also help provide abrasion resistance to help protect the sensors and electrical conductors 110 inside the sensor unit 30. In some circumstances, a protrusion 160 may help improve retention of the sleeve 112 in a desired location, such as when a protrusion 160 is compressed and secured inside a recess in another component of the brake assembly 10, such as the brake caliper 22, retainer strap 26, or the like. In at least one configuration, the protrusions 160 may be spaced apart from each other and may encircle the electrical conductor 110. For instance, the protrusions 160 may be configured as a generally circular discs that are axially spaced from each other when the sleeve 112 is not bent or is generally straight.

The coil member 114 may be received inside of the sensor unit 30 and the sleeve 112. The coil member 114 may resemble an elongated coil spring and include a plurality of coils that may extend around or spiral around the electrical conductor 110. At least a portion of the coil member 114 may be encapsulated in the sleeve 112 and may be encircled by one or more protrusions 160 if provided. In addition, a portion of the coil member 114 may be encapsulated in a portion of the sensor unit 30. In the configuration shown, a first end of the coil member 114 is disposed in the rear body 102; however, it is contemplated that the coil member 114 may have a greater length and may extend into and may be encapsulated in the bridge 104, the front body 100, or combinations thereof. A second end of the coil member 114 that is disposed opposite the first end may be located inside of the sleeve 112 or may extend out of the sleeve 112. The coil member 114 may provide multiple functions. For example, the coil member 114 may help reinforce or strengthen the sleeve 112 or the connection between the sleeve and the rear body 102 to help prevent the sleeve 112 from tearing. The coil member 114 may also be bent to a desired angle, shape, or orientation to help route the electrical conductors 110 and the sleeve 112 in a desired manner. For instance, the coil member 114 may be curved or bent in a manner that helps route the electrical conductors 110 away from locations where pinching or damage may occur, such as away from one or more sides of moveable components such as the brake pad assembly 24 or the tappet 60, and may then help maintain the desired shape, angle, or orientation. The coil member 114 may also provide strain relief that may inhibit inadvertent disconnection of an electrical conductor 110 and may help attenuate vibrations or inhibit vibration from damaging sensors or electrical connections.

As previously discussed, a single sensor unit 30 or multiple sensor units 30 may be provided with the brake assembly 10. When multiple sensor units 30 are provided, the sensor units 30 may be disconnected from each other or connected to each other. For instance, multiple sensor units 30 may be provided on the same brake pad assembly 24 or different brake pad assemblies 24 without being physically connected at or near the brake assembly 10 when a disconnected configuration is provided. Multiple sensor units 30 may be provided on the same brake pad assembly 24 or different brake pad assemblies 24 and may be physically connected to each other at or near the brake assembly 10 in a connected configuration. Examples of connected sensor units 30 will be discussed below primarily in the context of configurations having two sensor units 30 in which one sensor unit 30 straddles or is mounted to a first brake pad assembly 24 while the other sensor unit 30 straddles or is mounted to the second brake pad assembly 24. It is contemplated that sensor units may have a different number of sensors when multiple sensor units 30 are provided. For instance, a second sensor 108 may be provided with some but not all sensor units when multiple sensor units 30 are provided.

Referring to FIGS. 1-4 a configuration is shown in which a first sensor unit 30 is disposed on a first brake pad assembly 24 while the second sensor unit 30 is disposed on the second brake pad assembly 24. The first sensor unit 30 and the second sensor unit 30 are depicted as being aligned with each other and being disposed directly opposite each other; however, it is contemplated that the first sensor unit 30 and the second sensor unit 30 may be disposed in other positional arrangements. As is best shown in FIG. 3, a connecting member 170 may extend from the first sensor unit 30 to the second sensor unit 30. In at least one configuration, the connecting member 170 may extend from the front body 100 of the first sensor unit 30 to the front body 100 of the second sensor unit 30. The connecting member 170 may be configured as a pliable or bendable member that may allow the first sensor unit 30 and the second sensor unit 30 to move toward each other when braking is applied (e.g., when the first brake pad assembly 24 and the second brake pad assembly 24 are actuated toward the brake rotor 40) and may allow the first sensor unit 30 and the second sensor unit 30 to move away from each other when the brakes are released (e.g., when the first brake pad assembly 24 and the second brake pad assembly 24 move away from the brake rotor 40). As such, the shape or orientation of the connecting member 170 may change during operation of the brake assembly 10. In addition, the connecting member 170 may be provided with sufficient length to accommodate brake application and brake release regardless of the amount of wear of the friction material 82 (i.e., the connecting member 170 may accommodate unworn and fully worn brake pad assemblies). The connecting member 170 may be integrally formed with the first sensor unit 30, the second sensor unit 30, or both. For instance, the connecting member 170 may be molded with the first sensor unit 30 and the second sensor unit 30 to provide a unitary component.

Figure 7:
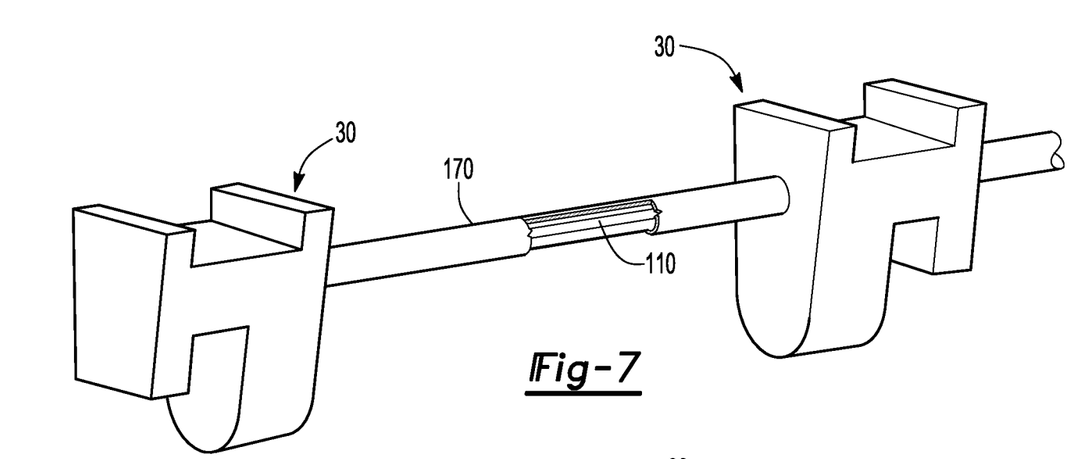
FIG. 7 is a fragmentary perspective view of another configuration of a sensor unit.

Referring to FIG. 7, the connecting member 170 may receive one or more connecting electrical conductors 110 that may extend between the first sensor unit 30 and the second sensor unit 30. Such a connecting member 170 may be provided in various configurations. For instance, the connecting member 170 may be configured as a hollow tube through which one or more connecting electrical conductors 110 may extend. Alternatively or in addition, the connecting member 170 may be molded or formed around one or more connecting electrical conductors 110 such that the connecting member 170 contacts and encapsulates the connecting electrical conductors 110.

Figure 8:
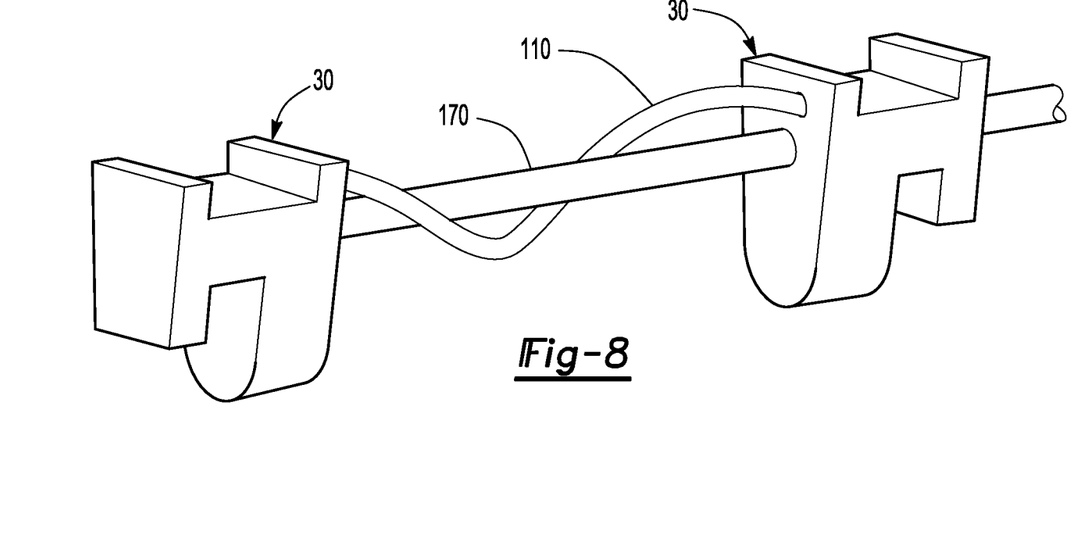
FIG. 8 is a perspective view of a configuration of a sensor unit having an external electrical conductor.

Referring to FIG. 8, one or more connecting electrical conductors 110 that extend between the first sensor unit 30 and the second sensor unit 30 may be disposed outside of the connecting member 170. For instance, one or more connecting electrical conductors 110 may loop or spiral around the connecting member 170 or may be attached to the connecting member 170. As such, the connecting member 170 may help support a connecting electrical conductor 110 in a manner that may help prevent pinching of an electrical conductor 110 or excessive bending of a connecting electrical conductor 110 that may break or damage the connecting electrical conductor 110. The connecting member 170 may be solid or hollow in this configuration. Moreover, the connecting member 170 may flex during brake operation or may be configured to retain its shape. If the connecting member 170 retains its shape, a sensor unit 30 may slide along the connecting member 170 during brake application and release. For instance, the connecting member 170 may extend through a hole in a sensor unit 30 and may have a length that does not interfere with brake application or release.

Figure 10:
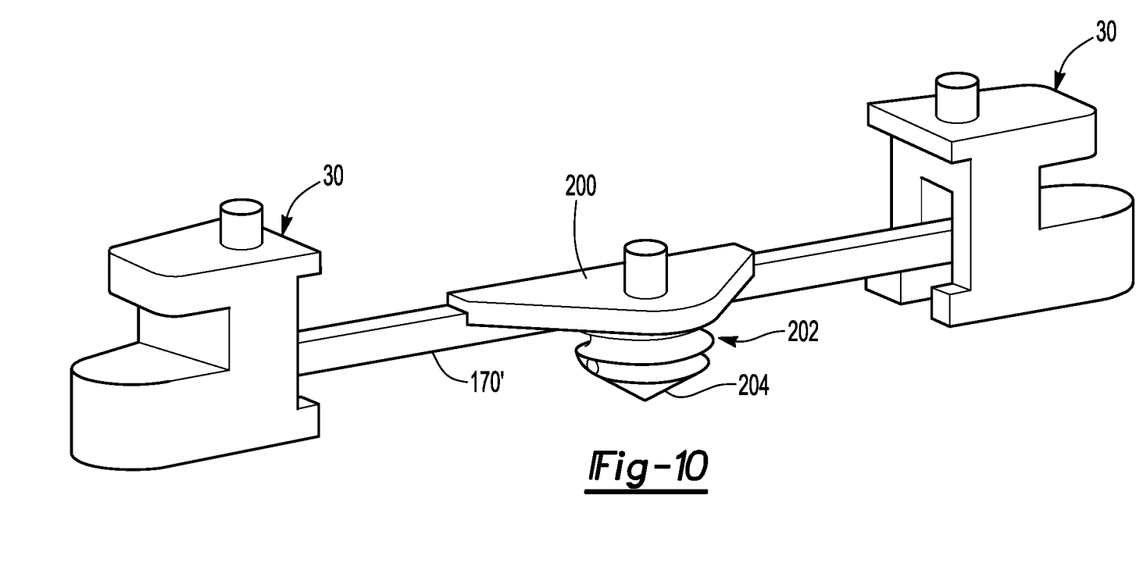
FIG. 10 is a perspective view of the sensor units of FIG. 9 in an uninstalled position.

Referring to FIGS. 9 and 10, a configuration is shown in which the connecting member 170' may be mountable to a brake pad retraction spring 32. As is best shown in FIG. 9, one or more brake pad retraction springs 32 may be provided with the brake assembly 10. A brake pad retraction spring 32 may facilitate retraction of the brake pad assemblies 24 away from the brake rotor 40 when braking force is not applied. As such, a brake pad retraction spring 32 may bias the brake pad assemblies 24 away from the brake rotor 40 and away from each other. In FIG. 9, first and second brake pad retraction springs 32 are illustrated that may extend in opposite lateral directions from the retainer strap 26, or to the left and right from the perspective shown in FIG. 9. The brake pad retraction spring 32 may extend between the first brake pad assembly 24 and the second brake pad assembly 24. For example, a brake pad retraction spring 32 may extend from the backplate 80 of the first brake pad assembly 24 to the backplate 80 of the second brake pad assembly 24. It is to be understood one or more brake pad retraction springs 32 may be provided with a brake assembly having any of the configurations associated with FIGS. 1-8.

The brake pad retraction spring 32 may be provided in various configurations. As an example, a brake pad retraction spring 32 may include a first end 180, a second end 182, a coil 184, a first arm 186, and a second arm 188.

The first end 180 may be mounted to a brake pad assembly 24. For example, the first end 180 of the brake pad retraction spring 32 may be inserted into and may be received in the hole 94 of the backplate 80 of a brake pad assembly 24.

The second end 182 may be disposed opposite the first end 180. The second end 182 may be mounted to the other brake pad assembly 24. For example, the second end 182 of the brake pad retraction spring 32 may be inserted into and may be received in the hole 94 of the backplate 80 of the other brake pad assembly 24.

The coil 184 may be disposed between the first end 180 and the second end 182. The coil 184 may engage the retainer strap 26. For instance, the coil 184 may contact a side of the retainer strap 26 that may face toward the brake rotor 40 and the cavity 70 to inhibit movement of the coil 184 away from the brake rotor 40 or rotation of the brake pad retraction spring 32 away from the brake rotor 40. The coil 184 may define a coil hole 190 that may extend around and may encircle a coil axis. The coil hole 190 and the coil axis may be encircled by one or more turns or spirals that make up the coil 184. Such turns or spirals may be stacked or arranged along the coil axis with respect to each other.

The first arm 186 may extend from the coil 184 toward the first end 180.

The second arm 188 may be spaced apart from the first arm 186. The second arm 188 may extend from the coil 184 toward the second end 182.

Referring to FIGS. 9 and 10, the connecting member 170' may be mountable to the brake pad retraction spring 32. For instance, the connecting member 170' may be mountable to the coil 184. A connecting electrical conductor 110 may be disposed inside or may be encapsulated by the connecting member 170' in any of the manners previously discussed. In at least one configuration, the connecting member 170' may include a flange 200 and a coil engagement feature 202, which are best shown in FIG. 10.

The flange 200 may extend from and may be integrally formed with the connecting member 170'. In the configuration shown, the flange 200 is disposed proximate the center of the connecting member 170' and is depicted as extending laterally from the connecting member 170'. In at least one configuration, the flange 200 may enclose or encapsulate a reinforcement member, such as a wire mesh, plate, rod, or the like to increase stiffness of the flange 200 and/or the coil engagement feature 202, which in turn may help transmit force during installation to help reduce installation effort.

The coil engagement feature 202 may extend from the flange 200. The coil engagement feature 202 may be mountable or couplable to the coil 184 of the brake pad retraction spring 32 and/or couplable between the coil 184 and the retainer strap 26. For instance, the coil engagement feature 202 may extend through the coil 184 of a brake pad retraction spring 32 to secure the connecting member 170' to the brake pad retraction spring 32. In at least one configuration, the coil 184 may be secured between the flange 200 and an enlarged head 204 of the coil engagement feature 202. The enlarged head 204 may have a larger diameter than the inside diameter of the coil 184. In addition, the enlarged head 204 may have a pointed or tapered configuration that may help position or center the coil engagement feature 202 with respect to the coil hole 190 and facilitate insertion of the enlarged head 204 into the coil hole 190.

The coil engagement feature 202 may be inserted into the coil hole 190 from either the top side or bottom side of the coil 184. In the configuration shown in FIG. 9, the coil engagement feature 202 is illustrated as being insertable from the top side of the coil 184 such that the flange 200 may extend over the coil 184 and a portion of the flange 200 may extend between the coil 184 and the retainer strap 26. As such, the connecting member 170' may be routed over the brake pad retraction spring 32 so that the brake pad retraction spring 32 may support the connecting member 170' and help prevent the connecting member 170' from contacting the brake rotor 40 or being pinched between a brake pad assembly 24 and the brake rotor 40.

It is also contemplated that a connecting member 170' may be supported by or attached to the retainer strap 26, such as via a clip, tray, or the like. It is also contemplated that an electrical conductor 110 may be routed around the cavity 70 of the brake caliper 22 rather than across the cavity 70 of the brake caliper 22. In such a configuration, an electrical conductor 110 may be guided by one or more ribs that are mounted to or formed with the brake caliper 22.

Figure 11:
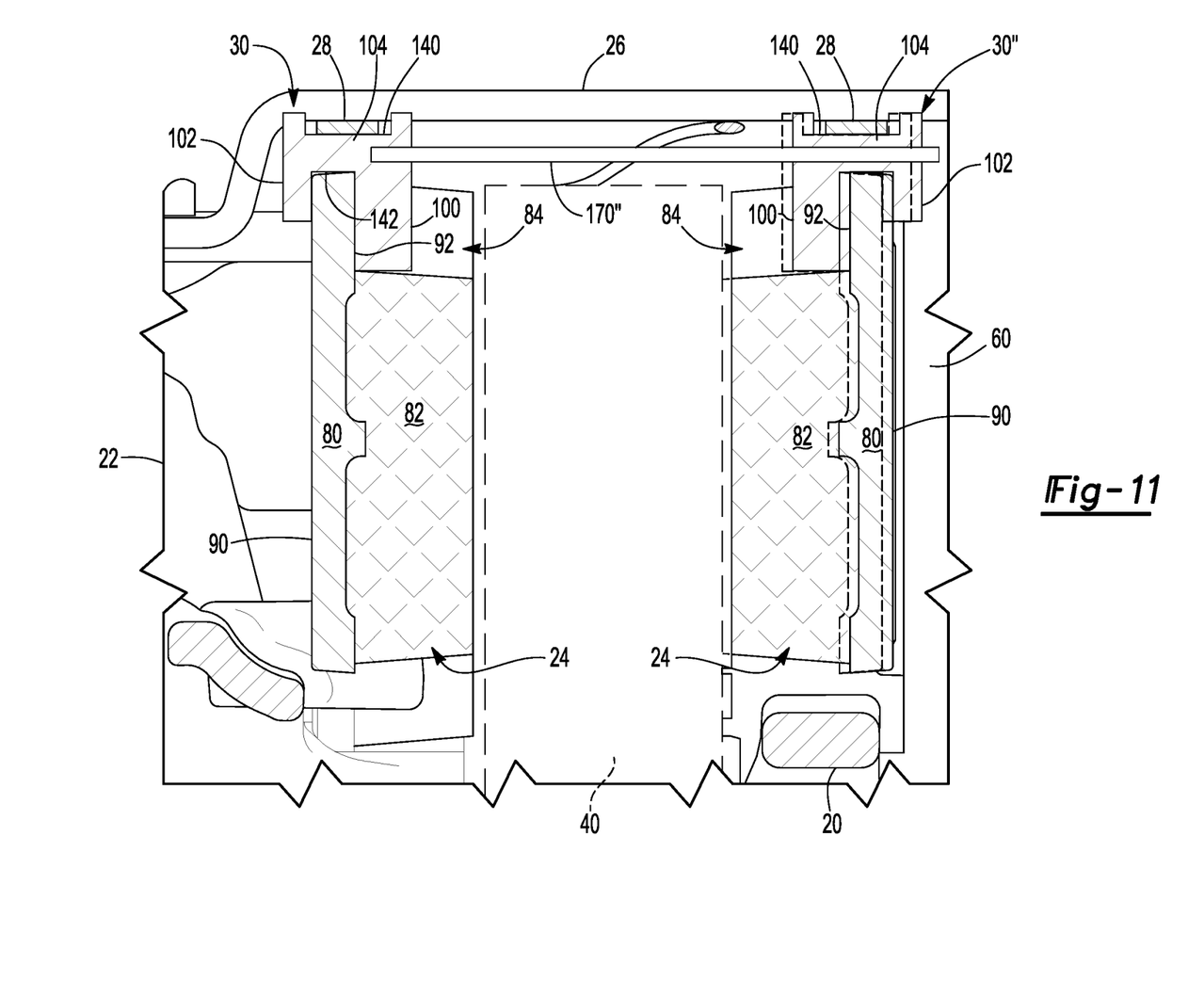
FIG. 11 is a section view based on FIG. 6 showing a sensor unit that is moveable with respect to a connecting member.

Referring to FIG. 11, an example of a configuration is shown in which at least one sensor unit may be moveable with respect to a connecting member. One sensor unit 30, such as the sensor unit that is mounted to the outboard brake pad assembly 24, may be stationary and may be coupled to the connecting member 170". Such coupling may be accomplished in any suitable manner, such as by providing a hole such as a blind hole in the sensor unit 30 that receives an end of the connecting member 170". The other sensor unit 30" may be moveable or slidable with respect to the connecting member 170". As an example, the sensor unit 30" may have a hole into which or through which the connecting member 170" may extend. The end of the connecting member 170" that is disposed closest to the sensor unit 30" may be spaced apart from components like the caliper housing 50, cover plate of the caliper housing 50, and the tappet 60 to accommodate movement of the brake pad assemblies 24. The connecting member 170" may be solid or hollow and may be inflexible or substantially rigid.

It is contemplated that one sensor unit may be moveable or both sensor units may be moveable. In FIG. 11, movement of the sensor unit 30" is shown in phantom. For instance, the sensor unit 30" may move with the inboard brake pad assembly 24 toward the brake rotor 40 when the tappet 60 is extended and thus slide along the connecting member 170" toward the brake rotor 40. The other sensor unit 30 may also move with the outboard brake pad assembly 24 to engage the brake rotor in response to the reaction force as previously described. It is noted that FIG. 11 does not show internal components of the sensor units for clarity.

A brake assembly as described above may allow a sensor unit to be mounted to a brake pad assembly without providing a slot in the backplate of a brake pad assembly through which the sensor unit extends, which may reduce associated costs and allow a sensor unit to be compatible with backplates that lack such slots. In addition, the backplate, friction material, and pad spring may cooperate to limit movement of a sensor unit in multiple directions, which may help better retain the sensor assembly during braking. The sensor unit may encapsulate sensors and wiring in areas near the friction material to help better withstand temperatures and environmental conditions. A coil member may be provided inside at least a portion of the sensor unit to help improve durability of the sensor unit, protect electrical conductors from abrasion, and help control positioning of the electrical conductors to avoid damage. Moreover, a coil member may also act as a heat conductor that may help transmit some thermal energy closer to a temperature sensor to facilitate temperature detection.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A brake assembly comprising:
    a brake pad assembly that includes friction material disposed on a front side of a backplate;
    a pad spring that is mounted to the backplate; and
    a sensor unit that straddles the backplate and that extends from the backplate to the pad spring, wherein the sensor unit includes a front body that engages the front side of the backplate, a rear body that engages a rear side of the backplate that is disposed opposite the front side, and a bridge that extends from the front body to the rear body, wherein the bridge engages the backplate and the pad spring, and a sensor is encapsulated in the sensor unit rearward of the front body.

2. The brake assembly of claim 1 wherein the friction material defines a recess that extends away from the pad spring and the sensor unit is at least partially received in the recess.

3. The brake assembly of claim 1 wherein the friction material defines a recess that extends away from the pad spring and the front body extends into the recess.

4. The brake assembly of claim 1 wherein the front body extends farther away from the pad spring than the rear body extends from the pad spring.

5. The brake assembly of claim 1 wherein the front body has a front body protrusion that extends away from the friction material, the rear body has a rear body protrusion, and the pad spring is received between the front body protrusion and the rear body protrusion.

6. The brake assembly of claim 1 wherein a first sensor is encapsulated in the front body.

7. The brake assembly of claim 6 wherein the first sensor provides a signal indicative of wear of the friction material.

8. The brake assembly of claim 1 wherein the sensor provides a signal indicative of temperature of the brake pad assembly.

9. The brake assembly of claim 1 wherein the sensor is encapsulated in the rear body.

10. The brake assembly of claim 1 wherein a sleeve extends from the sensor unit and encircles an electrical conductor.

11. The brake assembly of claim 10 wherein the sleeve includes a plurality of protrusions that extend away from the electrical conductor.

12. The brake assembly of claim 11 wherein the protrusions are spaced apart from each other and encircle the electrical conductor.

13. The brake assembly of claim 10 further comprising a coil member that is received inside the sensor unit and the sleeve, wherein coils of the coil member extend around the electrical conductor.

14. A brake assembly comprising:
 a brake pad assembly that includes friction material disposed on a front side of a backplate;
 a pad spring that is mounted to the backplate;
 a sensor unit that straddles the backplate and that extends from the backplate to the pad spring;
 a second brake pad assembly that includes friction material disposed on a second backplate;
 a second pad spring that is mounted to the second backplate;
 a second sensor unit that straddles the second backplate and that extends from the second backplate to the second pad spring; and
 a connecting electrical conductor that electrically connects the sensor unit to the second sensor unit.

15. The brake assembly of claim 14 wherein a connecting member extends from a front body of the sensor unit to a front body of the second sensor unit.

16. The brake assembly of claim 15 wherein at least one of the sensor unit and the second sensor unit is moveably disposed on the connecting member.

17. The brake assembly of claim 14 wherein a connecting member extends from the sensor unit to the second sensor unit, the second sensor unit and the connecting member are integrally formed.

18. The brake assembly of claim 17 wherein a brake pad retraction spring extends from the backplate of the brake pad assembly to the second backplate of the second brake pad assembly and biases the brake pad assembly and the second brake pad assembly away from each other, wherein the brake pad retraction spring includes a coil and the connecting member includes a flange and a coil engagement feature that extends from the flange and through the coil to secure the coil between the flange and the coil engagement feature.

19. A sensor unit comprising:
 a front body, the front body being adapted to engage a front side of a backplate of a brake pad assembly;
 a rear body that is spaced apart from and does not contact the front body, the rear body being adapted to engage a rear side of the backplate that is disposed opposite the front side of the backplate;
 a bridge that extends from the front body to the rear body, the bridge being adapted to engage the backplate and a pad spring; and
 a sensor that is encapsulated rearward of the front body in at least one of the rear body and the bridge.

20. The sensor unit of claim 19 further comprising another sensor that is encapsulated in the front body.

* * * * *